United States Patent
Sundman et al.

(10) Patent No.: US 11,894,962 B2
(45) Date of Patent: Feb. 6, 2024

(54) GUARD INTERVAL ADAPTATION FOR COORDINATED BEAMFORMING

(71) Applicant: Telefonaktiebolaget LM Ericsson (publ), Stockholm (SE)

(72) Inventors: Dennis Sundman, Sollentuna (SE); Miguel Lopez, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/624,475

(22) PCT Filed: Jul. 10, 2020

(86) PCT No.: PCT/EP2020/069508
§ 371 (c)(1),
(2) Date: Jan. 3, 2022

(87) PCT Pub. No.: WO2021/005200
PCT Pub. Date: Jan. 14, 2021

(65) Prior Publication Data
US 2022/0294676 A1    Sep. 15, 2022

Related U.S. Application Data

(60) Provisional application No. 62/872,961, filed on Jul. 11, 2019.

(51) Int. Cl.
*H04L 27/26* (2006.01)
*H04B 7/024* (2017.01)
*H04B 7/06* (2006.01)

(52) U.S. Cl.
CPC ......... *H04L 27/2602* (2013.01); *H04B 7/024* (2013.01); *H04B 7/0617* (2013.01); *H04L 27/2607* (2013.01)

(58) Field of Classification Search
CPC .............. H04L 27/2602; H04L 27/2607; H04L 5/0007
See application file for complete search history.

(56) References Cited

U.S. PATENT DOCUMENTS

2012/0294392 A1    11/2012    Zhang
2016/0149743 A1    5/2016    Rong et al.
(Continued)

FOREIGN PATENT DOCUMENTS

CN    105359446 A    2/2016
EP    3065427 A1 *    9/2016    ......... H04L 27/2607
(Continued)

OTHER PUBLICATIONS

International Search Report and Written Opinion dated Oct. 12, 2020 for International Application No. PCT/EP2020/069508 filed Jul. 10, 2020, consisting of 9-pages.
(Continued)

*Primary Examiner* — Kevin Kim
(74) *Attorney, Agent, or Firm* — Christopher & Weisberg, P.A.

(57) ABSTRACT

A method of transmitting an Orthogonal Frequency Division Multiplexing, OFDM, symbol having a guard interval including a cyclically repeated part of an original symbol comprises applying a guard interval for the OFDM symbol, the guard interval including a first part, where the first part is a cyclic prefix, including an indication whether the applied guard interval has a second part, wherein the second part is a cyclic prefix and/or postfix, applying, when indicated to be present, the second part of the guard interval, and transmitting the OFDM symbol. A method of receiving the symbol, transmitter, receiver and computer programs for implementing the methods are also disclosed.

17 Claims, 7 Drawing Sheets

(56) References Cited

U.S. PATENT DOCUMENTS

| | | | |
|---|---|---|---|
| 2016/0301556 A1* | 10/2016 | Nory | ............... H04L 27/2662 |
| 2016/0345348 A1 | 11/2016 | Chae et al. | |
| 2017/0126458 A1 | 5/2017 | Shattil | |
| 2017/0257238 A1 | 9/2017 | Qian et al. | |
| 2017/0310509 A1* | 10/2017 | Qian | ............... H04L 27/2691 |
| 2018/0139082 A1* | 5/2018 | Chen | ............... H04L 5/0007 |

FOREIGN PATENT DOCUMENTS

| | | | |
|---|---|---|---|
| JP | 2012503445 | A | 2/2012 |
| JP | 201588952 | A | 5/2015 |
| JP | 2017510151 | A | 4/2017 |
| KR | 20170120382 | A | 10/2017 |
| RU | 2348109 | C2 | 2/2009 |
| WO | 0130003 | A1 | 4/2001 |
| WO | 0219647 | A1 | 3/2002 |
| WO | 2005101700 | A1 | 10/2005 |
| WO | 2018174494 | A1 | 9/2018 |
| WO | 2018203628 | A1 | 11/2018 |

OTHER PUBLICATIONS

Vermani et al. "Terminology for AP Coordination"; IEEE 802.11-18/1926r2; Nov. 14, 2018, consisting of 10-pages.

Russian Office Action and Search Report with English Summary Translation dated May 12, 2022 for Patent Application No. 2022103288/07 filed Jul. 10, 2020, consisting of 17-pages.

Japanese Decision for Rejections and English translation dated Apr. 4, 2023 for Application No. 2022-500806, consisting of 10 pages.

Chinese Office Action and English Summary dated Dec. 8, 2023 for Application No. 202080050154.5, consisting of 12 pages.

3GPP TSG-RAN1 #30 R1-030114; Title: Revised Text proposal for Sections 3 & 4 of TR 25.892; Agenda item: 15 (OFDM); Source: Nortel Networks, France Telecom; Document for: Decision; Date and Location: Jan. 7-10, 2003 San Diego, CA, USA, consisting of 10 pages.

Wang et al. "Application of Cyclic Postfix in the Time Reversed-OFDM-based Underwater Communication" vol. 36 No. 5; ACTA Armamentarii; May 2015, consisting of 6 pages.

* cited by examiner

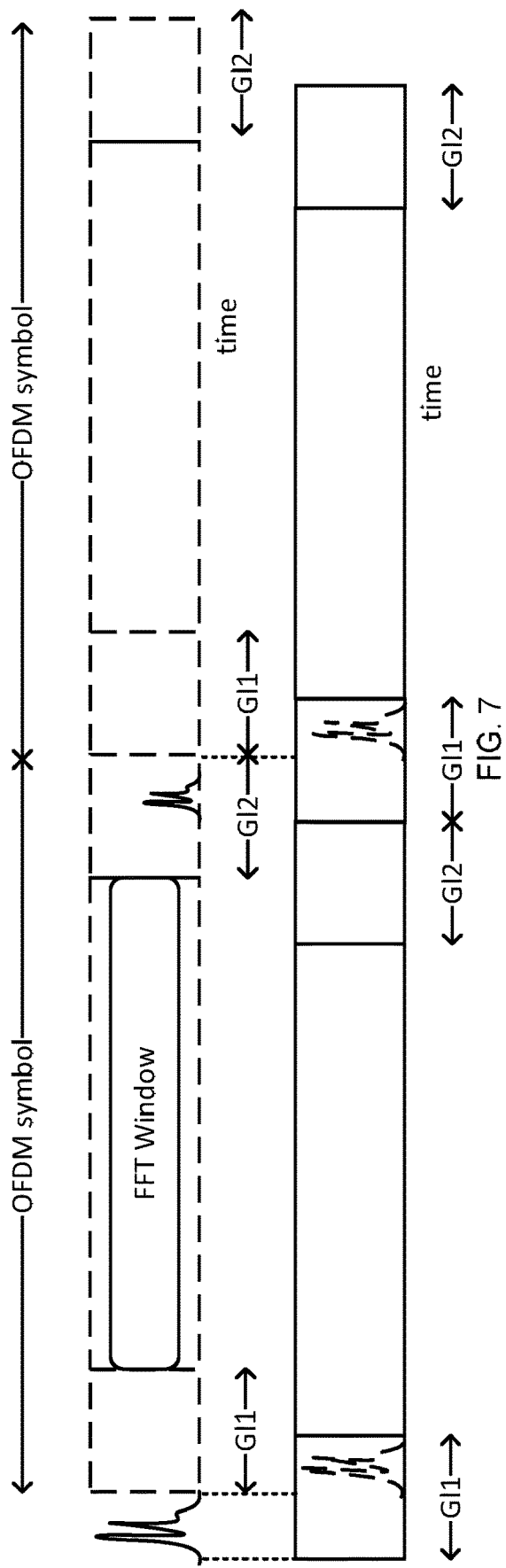
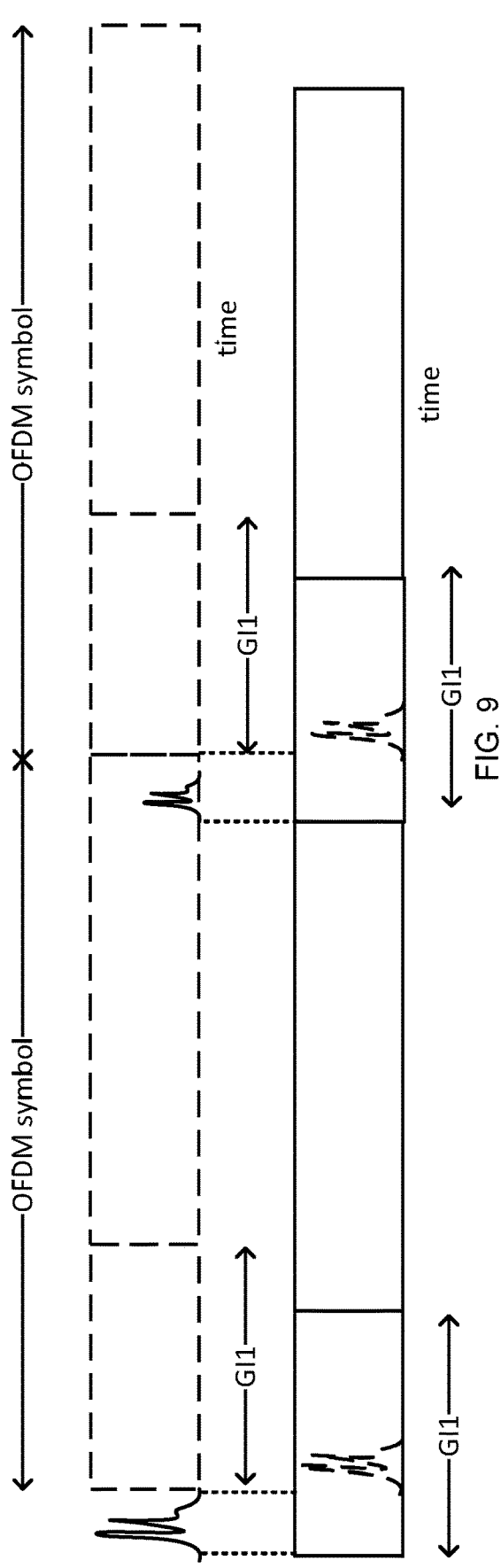
FIG. 7
FIG. 9

GUARD INTERVAL ADAPTATION FOR COORDINATED BEAMFORMING

CROSS-REFERENCE TO RELATED APPLICATIONS

This application is a Submission Under 35 U.S.C. § 371 for U.S. National Stage Patent Application of International Application No.: PCT/EP2020/069508, filed Jul. 10, 2020 entitled "GUARD INTERVAL ADAPTATION FOR COORDINATED BEAMFORMING," which claims priority to U.S. Provisional Application No. 62/872,961, filed Jul. 11, 2019 entitled "GUARD INTERVAL ADAPTATION FOR COORDINATED BEAMFORMING," the entireties of both of which are incorporated herein by reference.

TECHNICAL FIELD

The present disclosure generally relates to methods for transmitter and receiver, such transmitter and receiver, access point and station, and computer programs for implementing the methods. In particular, the present disclosure relates to adapting guard intervals to handle interference from transients of neighbouring nodes.

BACKGROUND

In telecommunications, the term cyclic prefix refers to the prefixing of a symbol, with a repetition of the end. The receiver is typically configured to discard the cyclic prefix samples, but the cyclic prefix serves two purposes:

- It provides a guard interval to eliminate intersymbol interference from the previous symbol.
- It repeats the end of the symbol so the linear convolution of a frequency-selective multipath channel can be modelled as circular convolution, which in turn may transform to the frequency domain via a discrete Fourier transform. This approach accommodates simple frequency domain processing, such as channel estimation and equalization.

For the cyclic prefix to serve its purposes, it is normally assigned to have a length at least equal to the length of a present multipath channel. The concept of a cyclic prefix is traditionally associated with Orthogonal Frequency Division Multiplexing, OFDM, systems.

Coordinated beamforming, CBF, is a feature discussed in the newly formed IEEE 802.11be task group (TGbe), see for example contribution to IEEE by Sameer Vermani of Qualcomm et al referenced IEEE 802.11-18/1926r2. One component in CBF is to place beamforming, BF, nulls in directions of unintended receivers in order to reduce interference and improve spatial re-use. These unintended receivers may be Stations, STAs, in neighbouring Basic Service Sets, BSSs. CBF is illustrated in FIG. 1, illustrating STAs and Access Points, APs, where STAs 1 and 2 are associated to AP1 and STAs 3 and 4 and associated to AP2. The APs coordinate their transmissions (illustrated by solid lines) so that when AP1 transmits to STAs 1 and 2 it places beamforming nulls (illustrated by dashed lines) in the direction of STAs 3 and 4. Similarly, when AP2 transmits to STAs 3 and 4 it places nulls in the directions of STAs 1 and 2. In this way AP1 and AP2 can access the medium at the same time without causing interference to the receivers.

It has been shown in e.g. contribution to the IEEE by Schelstraete et al of Quantenna Communications referenced IEEE 802.11-19/0638 that the received frame at a nulled STA is in fact not nulled completely. Firstly, the preamble is not precoded and thus a nulled STA may receive this part of the frame. Secondly, there is leakage at the transitions between OFDM symbols, which causes interference. The duration of these interference spikes is directly related to the time dispersion of the channel. This phenomenon is depicted in FIG. 2, which illustrates the fact that even if AP1 has ideal channel knowledge and places a beamforming null in the direction of STA3, it will still cause interference to STA3 at times corresponding to the transition of one OFDM symbol to the next.

A common practice in OFDM multicarrier systems is, as indicated above, to prepend a cyclic prefix to each OFDM symbol, to cope with time dispersion in the channel. In the IEEE 802.11 OFDM Physical layer, PHY, these Cyclic Prefixes, CPs, constitute Guard Intervals, GIs, as depicted in FIG. 3.

In IEEE 802.11ax, three different GIs were defined. The lengths being: 0.8 µs, 1.6 µs, and 3.2 µs. A short GI is advantageous since it gives the smallest overhead. Larger GIs are used when the time dispersion of the channel is larger. The duration of the GI used is signalled in the preamble of each PPDU, in one of the signalling (SIG) fields present in the PHY header (specifically in the SIG-A).

Since the guard interval of each OFDM symbol is removed at the receiver, if the APs synchronize their transmissions, then the interference due to imperfect nulling is mitigated, as illustrated in FIG. 3, see further IEEE 802.11-19/0638 mentioned above.

Typically, STAs within the same BSS can synchronize through a beacon, but obtaining accurate time synchronization among multiple BSSs is non-trivial and has not been yet incorporated into any IEEE 802.11 standard amendment. FIG. 4 illustrates how even small synchronization errors may result in interference. The effect of the interference can seriously degrade the performance when modulation and coding schemes having high code rates and/or high modulation orders are used.

Hence, just synchronizing the transmissions from the APs may not be enough to mitigate the interference problem. It is therefore a desire to at least for some situations enable interference mitigation related to the interference problem discussed above.

The above information disclosed in this Background section is only for enhancement of understanding of the background of the disclosure and therefore it may contain information that does not form the prior art that is already known to a person of ordinary skill in the art.

SUMMARY

The disclosure is based on the inventors' realization that, when CBF is used, all APs that coordinate downlink, DL, transmissions may agree to utilize larger GIs than would otherwise be needed to cope with time dispersion. In addition, two GIs are signalled to the receiving STAs because they should choose an appropriate synchronization window. The inventors have realized that this provides for more relaxed synchronization requirements among APs participating in CBF, and the use of CBF becomes more feasible.

According to a first aspect, there is provided a method of transmitting an Orthogonal Frequency Division Multiplexing, OFDM, symbol comprising a guard interval including a cyclically repeated part of an original symbol. The method comprises applying a guard interval for the OFDM symbol, the guard interval comprising a first part, where the first part is a cyclic prefix, including an indication whether the applied guard interval comprises a second part, wherein the second part is a cyclic prefix and/or postfix, applying, when indicated to be present, the second part of the guard interval, and transmitting the OFDM symbol.

The second part may comprise an extended cyclic prefix in relation to the first part of the guard interval. Additionally or alternatively, the second part of the guard interval may comprise a cyclic postfix.

The method may comprise determining whether to apply the second part of the guard interval, and performing the inclusion of the indication and the application of the second part when determined to apply the second part of the guard interval. determining whether to apply the second part of the guard interval may comprise determining whether coordinated beamforming transmission is performed between neighbouring access points, estimating impact of transients emanating from changes in the coordinated beamforming, and determining to apply the second part of the guard interval when estimated impact of transients has a timing within the second part of the guard interval. The estimating of the impact of transients may comprise determining timing of the second part of the guard interval and the estimated impact of transients based at least on one of: time dispersion of a channel on which the OFDM symbol is to be transmitted, estimated accuracy in synchronisation between a transmitting access point and a neighbouring interfering access point, and estimated duration of interfering transients from the neighbouring interfering access point. The determined timing of the second part of the guard interval may include adapting an amount of repetition forming the second part to cover the estimated impact of the transients.

According to a second aspect, there is provided a method of receiving an Orthogonal Frequency Division Multiplex, OFDM, symbol comprising a guard interval including a cyclically repeated part of an original symbol. The method comprises receiving a signal comprising the OFDM symbol, determining from the signal whether only a first part of the guard interval or also a second part of the guard interval is used for the OFDM symbol, where the second part includes a repeated part in addition to the first part, assigning a transform window for the OFDM symbol based on the guard interval, and demodulating the OFDM symbol including performing a transform of information within the transform window.

The second part of the guard interval may comprise an extended cyclic prefix in addition to the first part of the guard interval. The assigning of the transform window may include overlapping the transform window with the second part of the cyclic prefix such that a final part of the OFDM symbol is outside the transform window. Additionally or alternatively, the second part of the guard interval may comprise a cyclic postfix. The assigning of the transform window may include avoiding overlapping the cyclic postfix part of the OFDM symbol with the transform window such that a final part of the OFDM symbol is outside the transform window.

According to a third aspect, there is provided a transmitter for transmitting an Orthogonal Frequency Division Multiplex, OFDM, symbol via a channel, the OFDM symbol comprising a guard interval including a cyclically repeated part of an original symbol OFDM symbol. The transmitter comprises a transformer arranged to transform a series of frequency domain data symbols into a burst of time domain symbols forming the original OFDM symbol, a symbol former arranged to append to the time domain burst a first part of the guard interval for the OFDM symbol by duplication of a segment of the time domain burst, include an indication whether the guard interval further comprises a second part which is an extended guard interval part in relation to the first part of the guard interval, where the second part includes a repeated part in addition to the first part, and append the second part, when indicated, to the time domain burst, and transmitter circuitry arranged to transmit the formed OFDM symbol.

The second part of the guard interval may comprise an extended cyclic prefix in addition to the first part of the guard interval. Additionally or alternatively, the second part of the guard interval may comprise a cyclic postfix.

The transmitter may be arranged to determine whether to apply the second part of the guard interval, wherein the symbol former may be arranged to perform the inclusion of the indication and the appending of the second part when determined to apply the second part of the guard interval. The determination whether to apply the second part of the guard interval may comprise to determine whether coordinated beamforming transmission is performed between neighbouring access points, to estimate impact of transients emanating from changes in the coordinated beamforming, and to determine to apply the second part of the guard interval when estimated impact of transients has a timing within the second part of the guard interval. The estimation of the impact of transients may comprise a determination of timing of the second part of the guard interval and the estimated impact of transients based at least on one of: time dispersion of a channel on which the OFDM symbol is to be transmitted, estimated accuracy in synchronisation between a transmitting access point and a neighbouring interfering access point, and estimated duration of interfering transients from the neighbouring interfering access point. The determined timing of the second part of the guard interval may include an adaptation of an amount of repetition forming the second part to cover the estimated impact of the transients.

According to a fourth aspect, there is provided an access point for operating in an overlapping basic service set in a wireless local area network, wherein the access point comprises the transmitter of the third aspect.

According to a fifth aspect, there is provided a receiver for receiving an Orthogonal Frequency Division Multiplex, OFDM, symbol via a channel, the OFDM symbol comprising a guard interval including a cyclically repeated part of an original symbol OFDM symbol. The receiver comprises receiver circuitry arranged to receive a signal comprising the OFDM symbol, and demodulation circuitry arranged to determine from the signal whether only a first part of the guard interval or also a second part of the guard interval is used for the OFDM symbol, where the second part includes a repeated part in addition to the first part, assign a transform window for the OFDM symbol based on the guard interval, and demodulate the OFDM symbol including performing a transform of information within the transform window.

The second part of the guard interval may comprise an extended cyclic prefix in addition to the first part of the guard interval. To assign the transform window may include to overlap a part of the transform window with the second part of the cyclic prefix such that a final part of the OFDM symbol is outside the transform window. Alternatively or additionally, the second part of the guard interval may comprise a cyclic postfix. To assign the transform window may include avoiding overlap of the cyclic postfix part of the OFDM symbol with the transform window such that a final part of the OFDM symbol is outside the transform window.

According to a sixth aspect, there is provided a station for operating in an overlapping basic service set in a wireless local area network, wherein the station comprises the receiver of the fifth aspect.

According to a seventh aspect, there is provided a computer program comprising instructions which, when executed on a processor of a transmitter, causes the transmitter to perform the method according to the first aspect.

According to an eight aspect, there is provided a computer program comprising instructions which, when executed on a processor of a receiver, causes the receiver to perform the method according to the second aspect.

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings.

FIG. 7 illustrates improved tolerance to synchronization errors in CBF according to an embodiment.

FIG. 9 illustrates improved tolerance to synchronization errors in CBF according to an embodiment.

DETAILED DESCRIPTION

In this disclosure it is assumed that the APs participating in CBF are able communicate with each other by some means, either wired or wireless.

As suggested in IEEE 802.11-19/0638 referenced above, all APs participating in CBF synchronize in time their transmissions, so that transitions between OFDM symbols are transmitted simultaneously (or within a certain tolerance).

Figure 6:
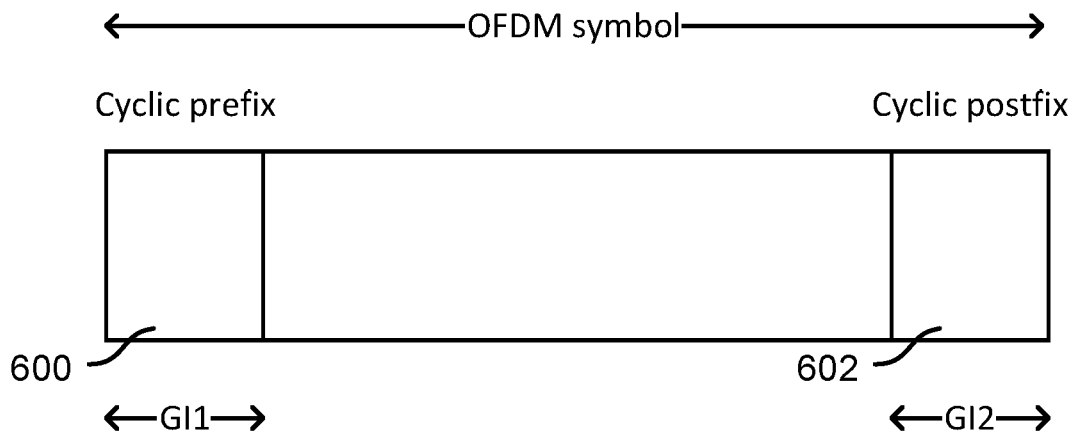
FIG. 6 illustrates forming of an OFDM symbol according to an embodiment.

In one embodiment, the transmitter formats the OFDM symbols by appending a second part 602 as a cyclic postfix at the end of each OFDM symbol, in addition to prepending a first part 600 as a cyclic prefix at the beginning of each OFDM symbol. The same GI duration can be used for both the cyclic prefix and cyclic suffix, as illustrated in FIG. 6, or be chosen otherwise.

The addition of the cyclic postfix provides tolerance to synchronization inaccuracies, as illustrated in FIG. 7.

The two GIs can be labelled GI1 and GI2, and they may be equal or may be different. The transmitter signals the presence of the two GIs and their values. For example, two elements in a SIG field present PHY header can be used to signal the values of the two GIs. Alternatively, if both GIs are equal, then one field can indicate the number of GIs (1 or 2, and only one bit is needed), and another field can indicate the duration (e.g. 0.8 µs, 1.6 µs or 3.2 µs). The receiver uses this information to place the FFT window used to transform the received signal to the frequency domain, as shown in FIG. 7.

Figure 8:
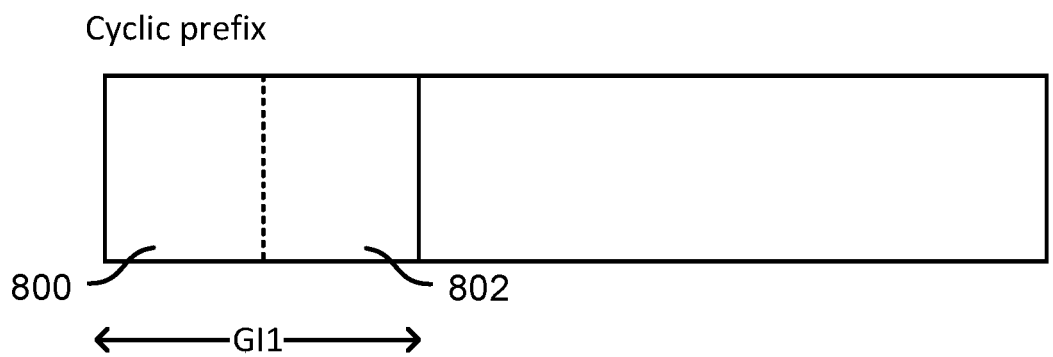
FIG. 8 illustrates forming of an OFDM symbol according to an embodiment.

In one embodiment the transmitter appends only one GI to each OFDM symbol. This GI is often larger than the GI used if no CBF is used, although it can also have the same duration when the channel dispersion is much smaller than the GI duration. This guard interval is here referenced GI1, which comprises a first part 800, i.e. according to legacy cyclic prefix, and a second part 802, as is illustrated in FIG. 8.

The transmitter signals to the receiver the use and duration of two GI values, named GI1 and GI2 in this disclosure. For example, two elements in a SIG field present PHY header can be used to signal the values of the two GIs. FIG. 9 illustrates the effect of interference due to imperfect nulling when two APs transmit simultaneously but there are small timing synchronization errors.

Figure 1:
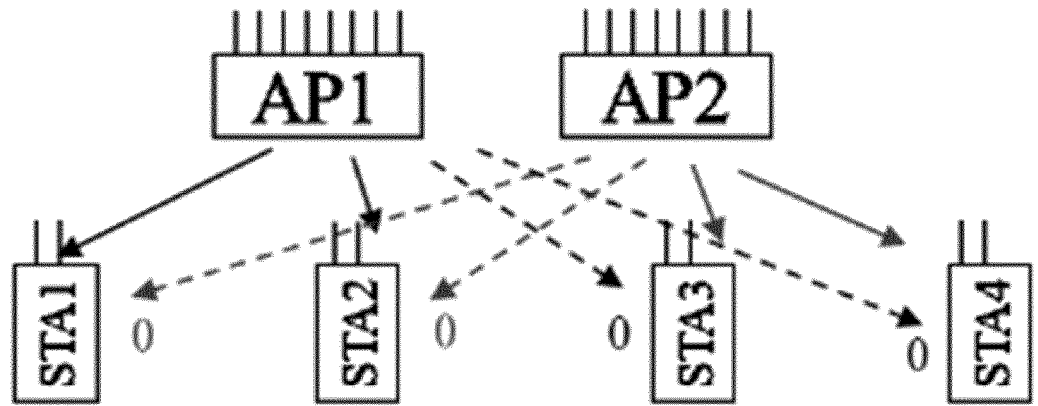
FIG. 1 schematically illustrates coordinated beamforming.
Figure 2:
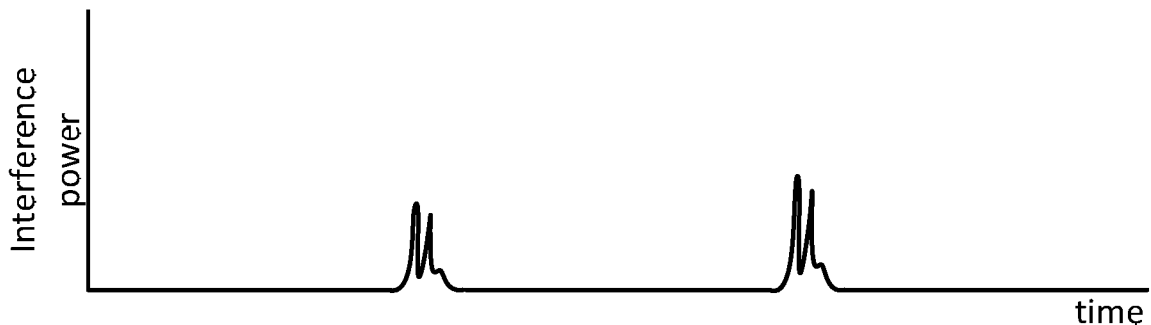
FIG. 2 is a chart illustrating interference power at STA 3 due to transmissions at AP1.
Figure 3:
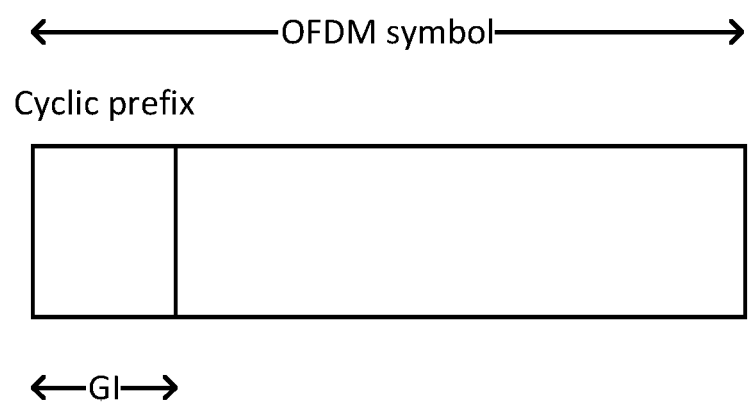
FIG. 3 schematically illustrates GI according to an example in an OFDM symbol.
Figure 4:
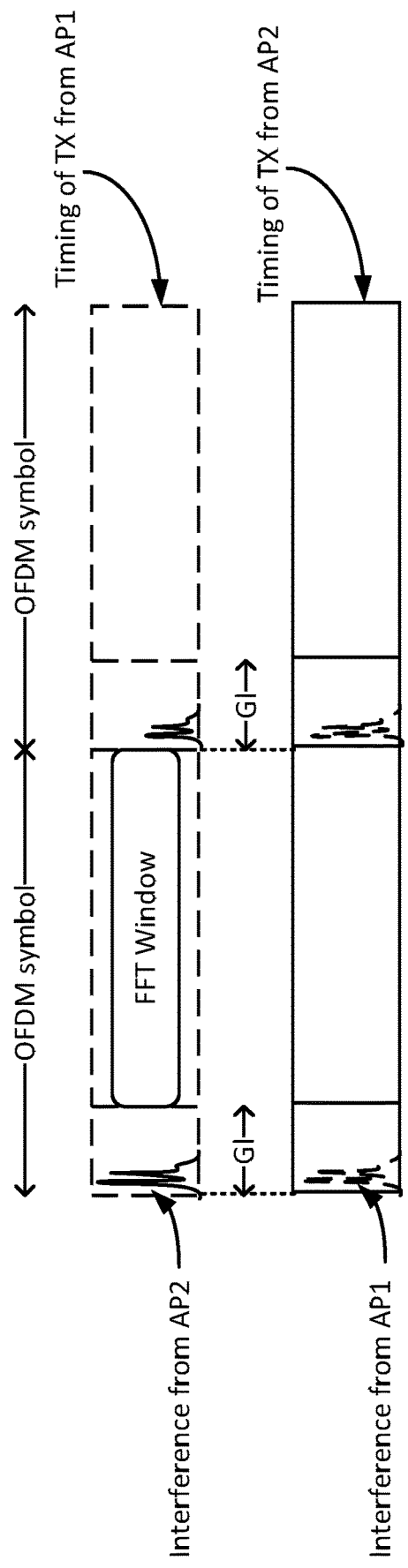
FIG. 4 illustrates an example how synchronized transmissions between AP1 and AP2 can be used to mitigate impact of interference.
Figure 5:
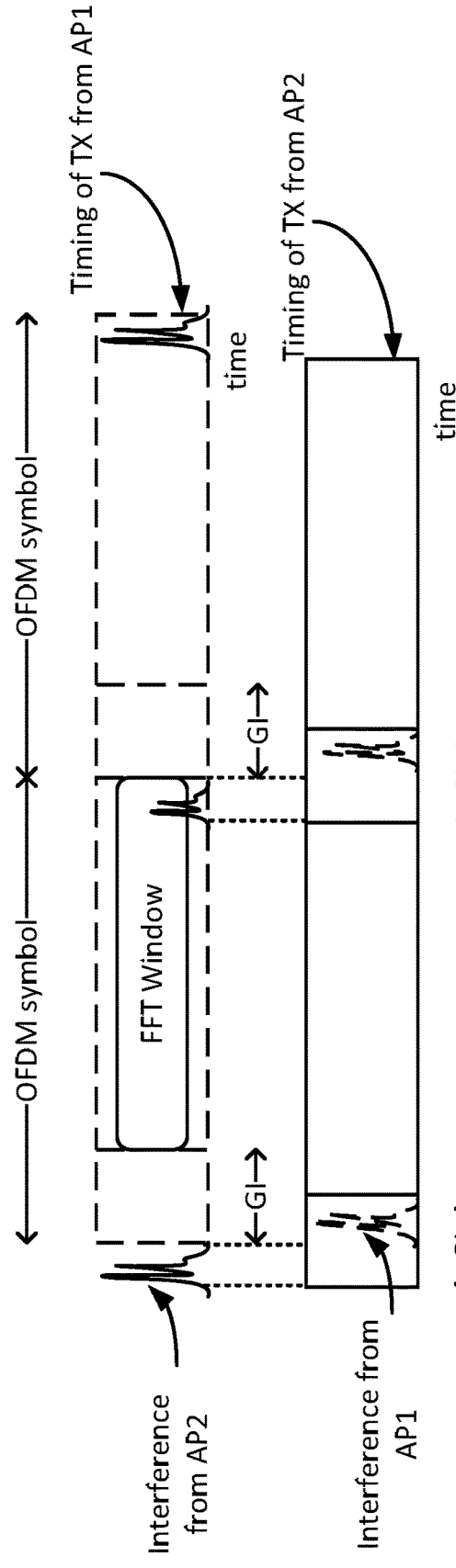
FIG. 5 illustrates another example where the effect of imperfect synchronization on CBF causes interference by transmissions from AP1 degrading the reception at STAs associated to AP2.
Figure 10:
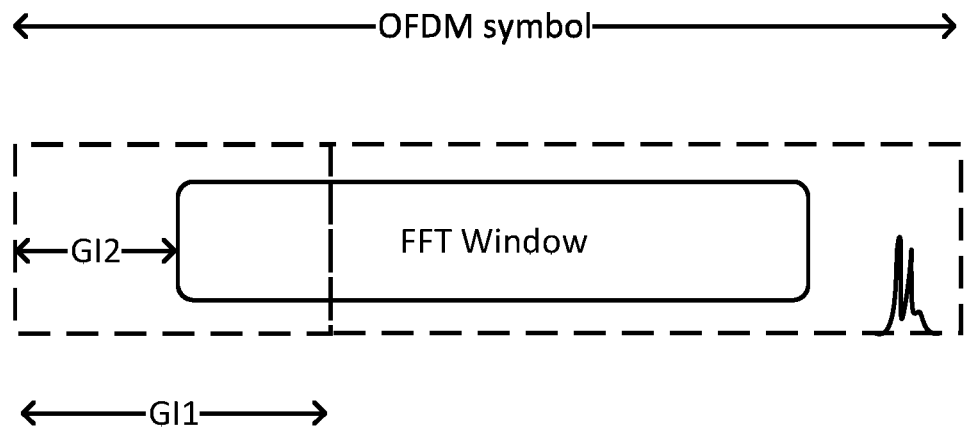
FIG. 10 schematically illustrates receiver processing, where the receiver places FFT window based on a first part of a GI according to an embodiment.

Although it appears that the situation is the same as that depicted in FIG. 5, there is a significant difference: The receiver is aware, through the signalling of the indication, of two GI intervals, which it employs to choose its synchronization window, as shown in FIG. 10. The receiver chooses the position of the FFT window based on the value of GI2. If these values are properly chosen by the APs, then the interference is avoided, as shown in FIG. 10.

As an example, consider the case where the APs choose a GI=0.8 µs when no CBF is used. In case CBF is used, then all the APs coordinate and may employ GI1=1.6 µs and GI2=0.8 µs. As a second example, consider the case where the APs choose a GI=0.8 µs when no CBF is used, and the channel dispersion is 0.1 µs. Then all the APs coordinate and may employ GI1=0.8 µs and GI2=0.4 µs. The choice of GI1 may for example depend on both the channel time dispersion and the magnitude of the timing errors.

Figure 11:
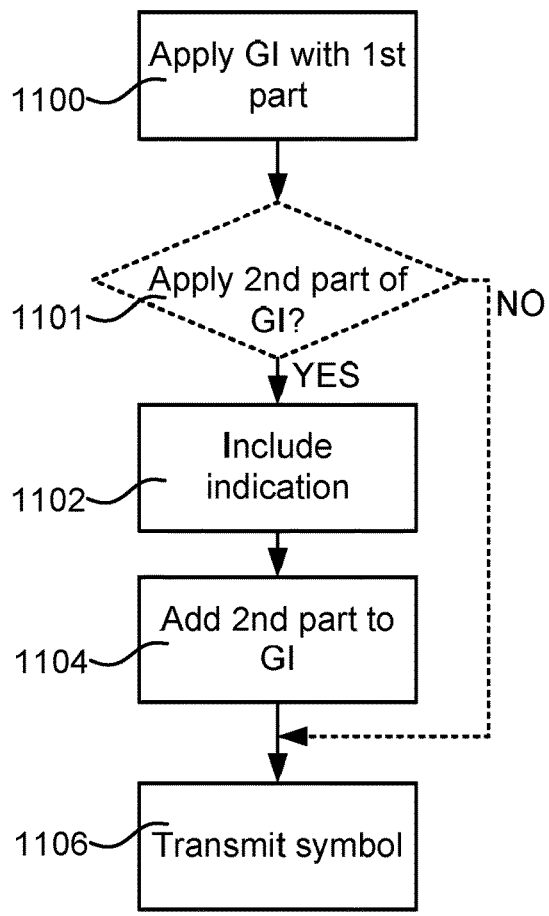
FIG. 11 is a flow chart illustrating a method of an AP according to an embodiment.

FIG. 11 is a flow chart illustrating a method of an AP according to an embodiment. When the AP is to send a symbol, it applies 1100 a GI with at least a first part. The AP may determine 1101 whether to use also a second part of GI, or may be preconfigured to use the second part. If no second part of GI is to be used, the AP transmits a legacy signal. If a second part is to be added, the AP includes 1102 an indication in signalling, e.g. in SIG field as discussed above, about the second part. The AP also adds 1104 the second part of the GI according to any of the approaches discussed above. The symbol is then transmitted 1106.

Figure 12:
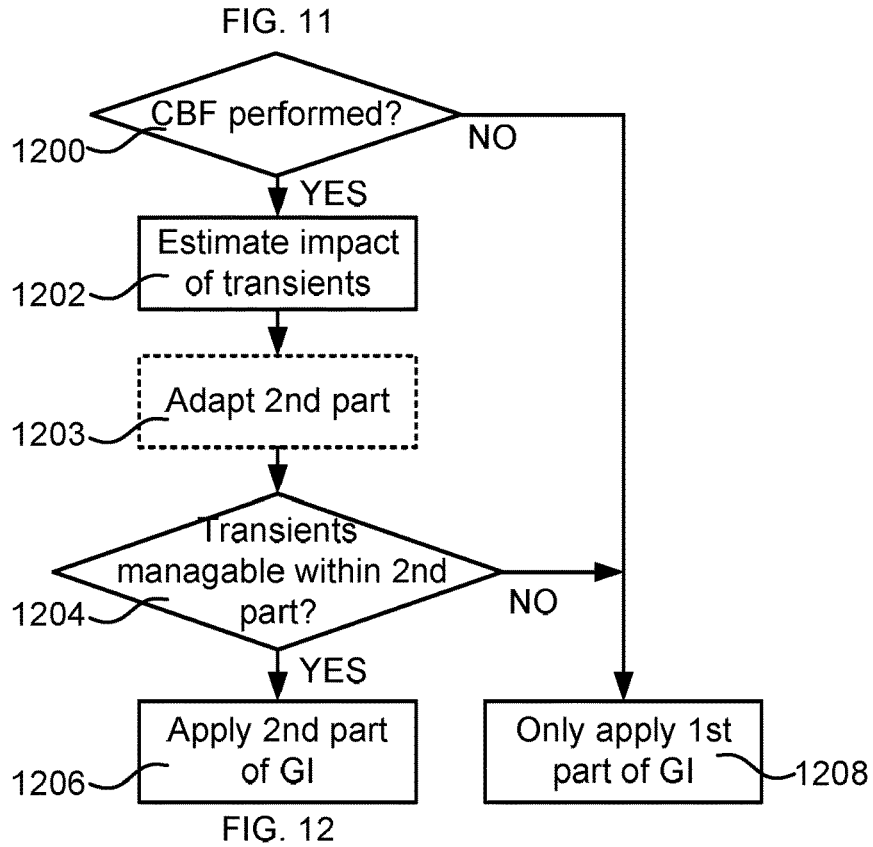
FIG. 12 is a flow chart illustrating an approach for determining application of the second part of the guard interval according to an embodiment.

FIG. 12 is a flow chart illustrating an approach for determining application of the second part of the guard interval according to an embodiment. That is, for the case where the use of the second part is not predetermined, the AP may dynamically select whether to use the second part, and optionally also dynamically assign properties of the second part. FIG. 12 illustrates a few examples of criteria for the determination, but fewer or more criteria may be used.

The AP determines 1200 whether CBF is performed. If not, the AP may select to use a legacy GI, i.e. only apply 1208 a first part of the GI. If CBF is performed, the AP may estimate 1202 impact of transients. The estimation may both include estimation of power of the transients and of timing of the transients. Optionally, the AP may adapt properties, e.g. length and/or position (prefix/postfix), of the second part of the GI to the estimated impact. The AP may determine 1204 whether the impact of the transients is manageable by the inclusion of the second part of the GI. If the AP determines that the second part cannot remedy for the transients, there is no reason for adding the extra transmission, and the AP may choose to apply 1208 only the first part. If the AP find the addition of the second part to enable mitigation of the effects of the transients, the AP applies 1206 the second part of the GI.

Figure 13:
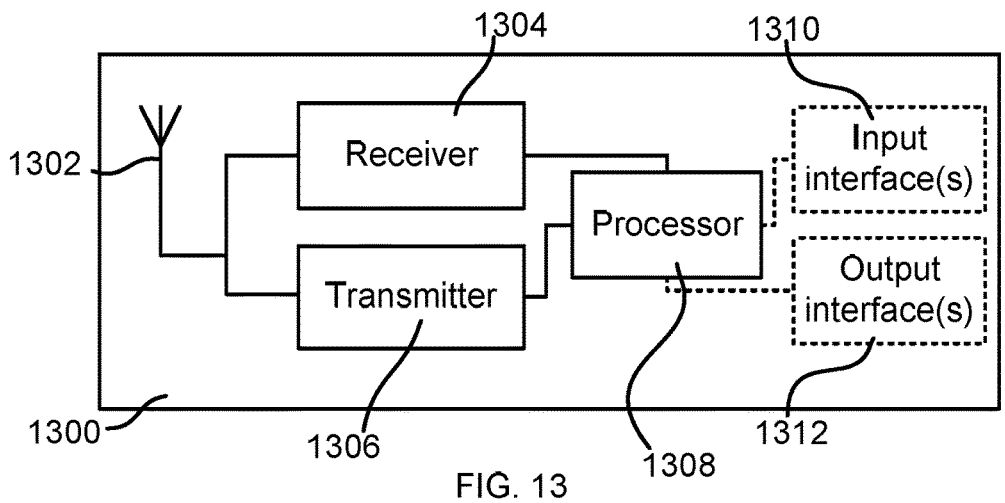
FIG. 13 is a block diagram schematically illustrating an AP according to an embodiment.

FIG. 13 is a block diagram schematically illustrating an AP 1300 according to an embodiment. The AP 1300 comprises an antenna arrangement 1302, a receiver 1304 connected to the antenna arrangement 1302, a transmitter 1306 connected to the antenna arrangement 1302, a processing element 1308 which may comprise one or more circuits, one or more input interfaces 1310 and one or more output interfaces 1312. The interfaces 1310, 1312 can be user interfaces and/or signal interfaces, e.g. electrical or optical. The AP 1300 is arranged to operate in a cellular communication network. In particular, by the processing element 1308 being arranged to perform the embodiments demonstrated with reference to FIGS. 6 to 12, the AP 1300 is capable of enabling interference mitigation. The processing element 1308 can also fulfil a multitude of tasks, ranging from signal processing to enable reception and transmission since it is connected to the receiver 1304 and transmitter 1306, executing applications, controlling the interfaces 1310, 1312, etc. For example, the transmitter 1306 and the processing element 1308 may form logical entities such as a transformer arranged to transform a series of frequency data symbols into a burst of time domain symbols forming an original OFDM symbol, and a symbol former arranged to append to the time domain burst a first part of the guard interval for the OFDM symbol by duplication of a segment of the time domain burst, include an indication whether the guard interval further comprises a second part which is an extended guard interval part in relation to the first part of the guard interval, where the second part includes a repeated part in addition to the first part, and append the second part, when indicated, to the time domain burst. The transmitter 1306 comprises transmitter circuitry for transmitting the formed OFDM symbol.

Figure 14:
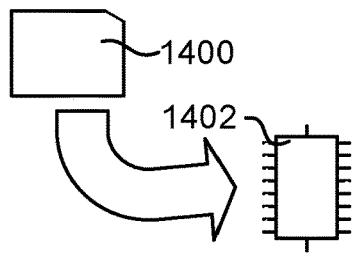
FIG. 14 schematically illustrates a computer-readable medium and a processing device.

The methods for the AP are suitable for implementation with aid of processing means, such as computers and/or processors, especially for the case where the processing element 1308 demonstrated above comprises a processor handling the enabling of interference mitigation. Therefore, there is provided computer programs, comprising instructions arranged to cause the processing means, processor, or computer to perform the steps of any of the methods according to any of the embodiments described with reference to FIGS. 6 to 13. The computer programs preferably comprise program code which is stored on a computer readable medium 1400, as illustrated in FIG. 14, which can be loaded and executed by a processing means, processor, or computer 1402 to cause it to perform the methods, respectively, according to embodiments of the present disclosure, preferably as any of the embodiments described with reference to FIGS. 6 to 13. The computer 1402 and computer program product 1400 can be arranged to execute the program code sequentially where actions of the any of the methods are performed stepwise, or be performed on a real-time basis. The processing means, processor, or computer 1402 is preferably what normally is referred to as an embedded system. Thus, the depicted computer readable medium 1400 and computer 1402 in FIG. 14 should be construed to be for illustrative purposes only to provide understanding of the principle, and not to be construed as any direct illustration of the elements.

Figure 15:
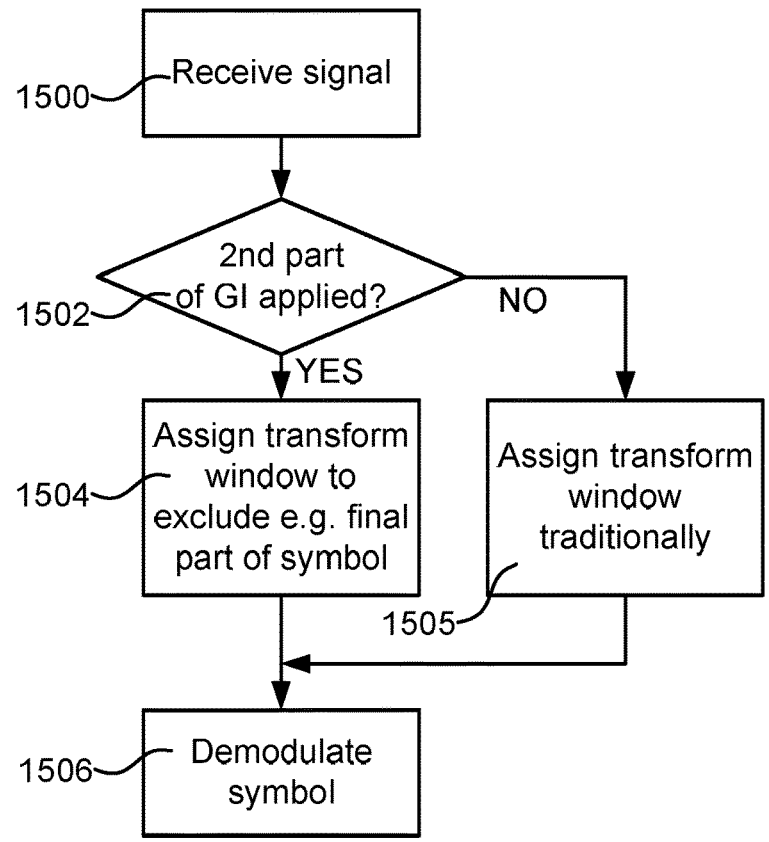
FIG. 15 is a flow chart illustrating a method of a STA according to an embodiment.

FIG. 15 is a flow chart illustrating a method of a STA according to an embodiment. The STA receives 1500 a signal and determines 1502, e.g. from control information in SIG field, whether (and how) a second part of GI is applied. If no second part is indicated, the STA assigns its transform window traditionally, i.e. in relation to the first part of the GI, and demodulates 1506 the symbol. If the second part is indicated, the STA assigns 1504 the transform window to avoid the transient, e.g. by excluding a final part of the symbol and then demodulates 1506 the symbol.

Figure 16:
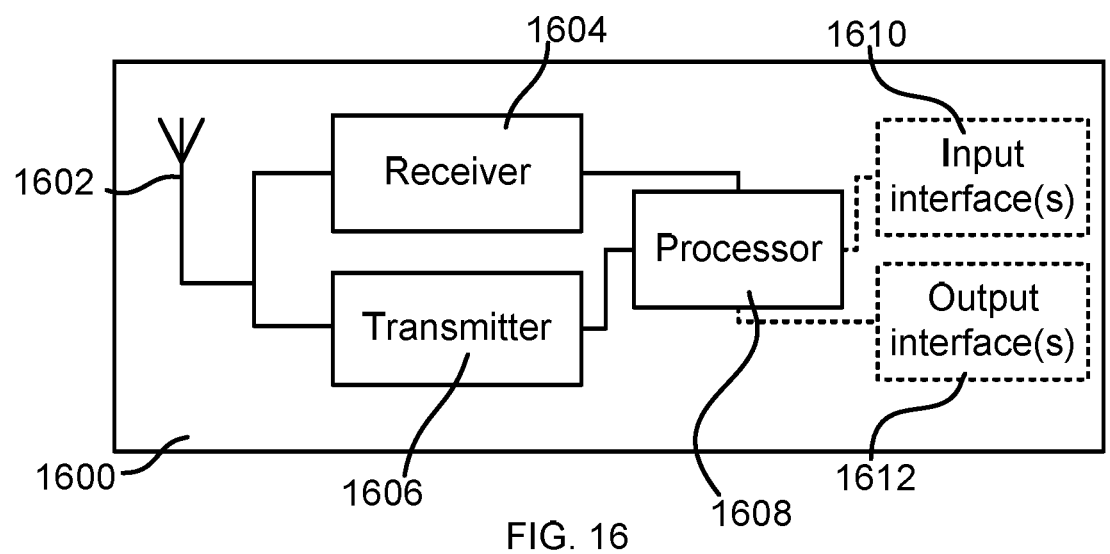
FIG. 16 is a block diagram schematically illustrating a STA according to an embodiment.

FIG. 16 is a block diagram schematically illustrating an STA 1600 according to an embodiment. The STA 1600 comprises an antenna arrangement 1602, a receiver 1604 connected to the antenna arrangement 1602, a transmitter 1606 connected to the antenna arrangement 1602, a processing element 1608 which may comprise one or more circuits, one or more input interfaces 1610 and one or more output interfaces 1612. The interfaces 1610, 1612 can be user interfaces and/or signal interfaces, e.g. electrical or optical. The STA 1600 is arranged to operate in a cellular communication network. In particular, by the processing element 1608 being arranged to perform the embodiments demonstrated with reference to FIGS. 6 to 10 and 15, the STA 1600 is capable of interference mitigation. The processing element 1608 can also fulfil a multitude of tasks, ranging from signal processing to enable reception and transmission since it is connected to the receiver 1604 and transmitter 1606, executing applications, controlling the interfaces 1610, 1612, etc. The receiver 1604 comprises receiver circuitry for receiving a signal comprising an OFDM symbol. The receiver 1604 and the processing element 1608 may together form a logical entity of demodulation circuitry arranged to determine from the signal whether only a first part of the guard interval or also a second part of the guard interval is used for the OFDM symbol, where the second part includes a repeated part in addition to the first part, assign a transform window for the OFDM symbol based on the guard interval, and demodulate the OFDM symbol including performing a transform of information within the transform window.

Figure 17:
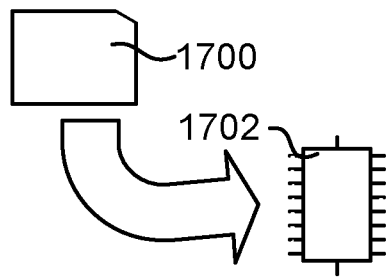
FIG. 17 schematically illustrates a computer-readable medium and a processing device.

The methods for the STA are suitable for implementation with aid of processing means, such as computers and/or processors, especially for the case where the processing element 1608 demonstrated above comprises a processor handling interference mitigation. Therefore, there is provided computer programs, comprising instructions arranged to cause the processing means, processor, or computer to perform the steps of any of the methods according to any of the embodiments described with reference to FIGS. 6 to 10, 15 and 16. The computer programs preferably comprise program code which is stored on a computer readable medium 1700, as illustrated in FIG. 17, which can be loaded and executed by a processing means, processor, or computer 1702 to cause it to perform the methods, respectively, according to embodiments of the present disclosure, preferably as any of the embodiments described with reference to FIGS. 6 to 10, 15 and 16. The computer 1702 and computer program product 1700 can be arranged to execute the program code sequentially where actions of the any of the methods are performed stepwise, or be performed on a real-time basis. The processing means, processor, or computer 1702 is preferably what normally is referred to as an embedded system. Thus, the depicted computer readable medium 1700 and computer 1702 in FIG. 17 should be construed to be for illustrative purposes only to provide understanding of the principle, and not to be construed as any direct illustration of the elements.

Certain aspects of the concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features This Disclosure May be Summarized by the Following Items:

1. A method of transmitting an Orthogonal Frequency Division Multiplexing, OFDM, symbol comprising a guard interval including a cyclically repeated part of an original symbol, the method comprising
   applying a guard interval for the OFDM symbol, the guard interval comprising a first part, where the first part is a cyclic prefix;
   including an indication whether the applied guard interval comprises a second part, wherein the second part is a cyclic prefix and/or postfix;
   applying, when indicated to be present, the second part of the guard interval; and
   transmitting the OFDM symbol.
2. The method of item 1, wherein the second part comprises an extended cyclic prefix in relation to the first part of the guard interval.
3. The method of item 1 or 2, wherein the second part of the guard interval comprises a cyclic postfix.
4. The method of any one of items 1 to 3, comprising
   determining whether to apply the second part of the guard interval; and
   performing the inclusion of the indication and the application of the second part when determined to apply the second part of the guard interval.
5. The method of item 4, wherein the determining whether to apply the second part of the guard interval comprises
   determining whether coordinated beamforming transmission is performed between neighbouring access points;
   estimating impact of transients emanating from changes in the coordinated beamforming; and
   determining to apply the second part of the guard interval when estimated impact of transients has a timing within the second part of the guard interval.
6. The method of item 5, wherein the estimating of the impact of transients comprises
   determining timing of the second part of the guard interval and the estimated impact of transients based at least on one of:
   time dispersion of a channel on which the OFDM symbol is to be transmitted,
   estimated accuracy in synchronisation between a transmitting access point and a neighbouring interfering access point, and
   estimated duration of interfering transients from the neighbouring interfering access point.
7. The method of item 6, wherein the determined timing of the second part of the guard interval includes adapting an amount of repetition forming the second part to cover the estimated impact of the transients.
8. A method of receiving an Orthogonal Frequency Division Multiplex, OFDM, symbol comprising a guard interval including a cyclically repeated part of an original symbol, the method comprising
   receiving a signal comprising the OFDM symbol;
   determining from the signal whether only a first part of the guard interval or also a second part of the guard interval is used for the OFDM symbol, where the second part includes a repeated part in addition to the first part;
   assigning a transform window for the OFDM symbol based on the guard interval; and
   demodulating the OFDM symbol including performing a transform of information within the transform window.
9. The method of item 8, wherein the second part of the guard interval comprises an extended cyclic prefix in addition to the first part of the guard interval.
10. The method of item 9, wherein the assigning of the transform window includes overlapping the transform window with the second part of the cyclic prefix such that a final part of the OFDM symbol is outside the transform window.
11. The method of item 8, 9 or 10, wherein the second part of the guard interval comprises a cyclic postfix.
12. The method of item 11, wherein the assigning of the transform window includes avoiding overlapping the cyclic postfix part of the OFDM symbol with the transform window such that a final part of the OFDM symbol is outside the transform window.
13. A transmitter for transmitting an Orthogonal Frequency Division Multiplex, OFDM, symbol via a channel, the OFDM symbol comprising a guard interval including a cyclically repeated part of an original symbol OFDM symbol, the transmitter comprising
   a transformer arranged to transform a series of frequency domain data symbols into a burst of time domain symbols forming the original OFDM symbol;
   a symbol former arranged to append to the time domain burst a first part of the guard interval for the OFDM symbol by duplication of a segment of the time domain burst, include an indication whether the guard interval further comprises a second part which is an extended guard interval part in relation to the first part of the guard interval, where the second part includes a repeated part in addition to the first part, and append the second part, when indicated, to the time domain burst; and
   transmitter circuitry arranged to transmit the formed OFDM symbol.

14. The transmitter of item 13, wherein the second part of the guard interval comprises an extended cyclic prefix in addition to the first part of the guard interval.
15. The transmitter of item 13 or 14, wherein the second part of the guard interval comprises a cyclic postfix.
16. The transmitter of any one of items 13 to 15, arranged to determine whether to apply the second part of the guard interval, wherein the symbol former is arranged to perform the inclusion of the indication and the appending of the second part when determined to apply the second part of the guard interval.
17. The transmitter of item 16, wherein the determination whether to apply the second part of the guard interval comprises
    to determine whether coordinated beamforming transmission is performed between neighbouring access points;
    to estimate impact of transients emanating from changes in the coordinated beamforming; and
    to determine to apply the second part of the guard interval when estimated impact of transients has a timing within the second part of the guard interval.
18. The transmitter of item 17, wherein the estimation of the impact of transients comprises a determination of timing of the second part of the guard interval and the estimated impact of transients based at least on one of:
    time dispersion of a channel on which the OFDM symbol is to be transmitted,
    estimated accuracy in synchronisation between a transmitting access point and a neighbouring interfering access point, and
    estimated duration of interfering transients from the neighbouring interfering access point.
19. The transmitter of item 18, wherein the determined timing of the second part of the guard interval includes adaptation of an amount of repetition forming the second part to cover the estimated impact of the transients.
20. An access point for operating in an overlapping basic service set in a wireless local area network, wherein the access point comprises the transmitter of any one of items 13 to 19.
21. A receiver for receiving an Orthogonal Frequency Division Multiplex, OFDM, symbol via a channel, the OFDM symbol comprising a guard interval including a cyclically repeated part of an original symbol OFDM symbol, the receiver comprising
    receiver circuitry arranged to receive a signal comprising the OFDM symbol; and
    demodulation circuitry arranged to determine from the signal whether only a first part of the guard interval or also a second part of the guard interval is used for the OFDM symbol, where the second part includes a repeated part in addition to the first part, assign a transform window for the OFDM symbol based on the guard interval, and demodulate the OFDM symbol including performing a transform of information within the transform window.
22. The receiver of item 21, wherein the second part of the guard interval comprises an extended cyclic prefix in addition to the first part of the guard interval.
23. The receiver of item 22, wherein to assign the transform window includes to overlap a part of the transform window with the second part of the cyclic prefix such that a final part of the OFDM symbol is outside the transform window.
24. The receiver of item 23, wherein the second part of the guard interval comprises a cyclic postfix.
25. The receiver of item 24, wherein to assign the transform window includes avoiding overlap of the cyclic postfix part of the OFDM symbol with the transform window such that a final part of the OFDM symbol is outside the transform window.
26. A station for operating in an overlapping basic service set in a wireless local area network, wherein the station comprises the receiver of any one of items 20 to 25.
27. A computer program comprising instructions which, when executed on a processor of a transmitter, causes the transmitter to perform the method according to any of items 1 to 7.
28. A computer program comprising instructions which, when executed on a processor of a receiver, causes the receiver to perform the method according to any of items 8 to 12.

The invention claimed is:
1. A method of transmitting an Orthogonal Frequency Division Multiplexing, OFDM, symbol comprising a guard interval including a cyclically repeated part of an original symbol, the method comprising
    applying a guard interval for the OFDM symbol, the guard interval comprising a first part, where the first part is a cyclic prefix;
    determining whether to use the second part of the guard interval, and when it is determined that the second part of the guard interval is to be used:
        including an indication that the applied guard interval comprises a second part, the second part being at least one of a cyclic prefix and a postfix;
        applying the second part of the guard interval; and
    transmitting the OFDM symbol; and
    the determining whether to use the second part of the guard interval comprises:
        determining whether coordinated beamforming transmission is performed between neighbouring access points;
        estimating impact of transients emanating from changes in the coordinated beamforming; and
        determining to apply the second part of the guard interval when estimated impact of transients has a timing within the second part of the guard interval.
2. The method of claim 1, wherein the second part comprises an extended cyclic prefix in relation to the first part of the guard interval.
3. The method of claim 1, wherein the second part of the guard interval comprises a cyclic postfix.
4. The method of claim 1, wherein the estimating of the impact of transients comprises:
    determining timing of the second part of the guard interval and the estimated impact of transients based at least on one of:
    time dispersion of a channel on which the OFDM symbol is to be transmitted,
    estimated accuracy in synchronisation between a transmitting access point and a neighbouring interfering access point, and
    estimated duration of interfering transients from the neighbouring interfering access point.
5. The method of claim 4, wherein the determined timing of the second part of the guard interval includes adapting an amount of repetition forming the second part to cover the estimated impact of the transients.

6. A method of receiving an Orthogonal Frequency Division Multiplex, OFDM, symbol comprising a guard interval including a cyclically repeated part of an original symbol, the method comprising:
   receiving a signal comprising the OFDM symbol;
   determining from the signal whether only a first part of the guard interval or also a second part of the guard interval is used for the OFDM symbol, where the second part includes a repeated part in addition to the first part;
   assigning a transform window for the OFDM symbol based on the guard interval; and
   demodulating the OFDM symbol including performing a transform of information within the transform window;
   the second part of the guard interval comprising one of:
      an extended cyclic prefix in addition to the first part of the guard interval; and
      cyclic prefix; and
   the assigning of the transform window includes one of:
      overlapping the transform window with the second part of the cyclic prefix such that a final part of the OFDM symbol is outside the transform window; and
      overlapping the cyclic prefix part of the OFDM symbol with the transform window such that a final part of the OFDM symbol is outside the transform window.

7. A transmitter for transmitting an Orthogonal Frequency Division Multiplex, OFDM, symbol via a channel, the OFDM symbol comprising a guard interval including a cyclically repeated part of an original symbol OFDM symbol, the transmitter comprising:
   a transformer configured to transform a series of frequency domain data symbols into a burst of time domain symbols forming the original OFDM symbol;
   a symbol former configured to append to the time domain burst a first part of the guard interval for the OFDM symbol by duplication of a segment of the time domain burst, include an indication whether the guard interval further comprises a second part which is an extended guard interval part in relation to the first part of the guard interval, where the second part includes a repeated part in addition to the first part, and append the second part, when indicated, to the time domain burst; and
   transmitter circuitry configured to transmit the formed OFDM symbol.

8. The transmitter of claim 7, wherein the second part of the guard interval comprises an extended cyclic prefix in addition to the first part of the guard interval.

9. The transmitter of claim 7, wherein the second part of the guard interval comprises a cyclic postfix.

10. The transmitter of claim 7, configured to determine whether to apply the second part of the guard interval, wherein the symbol former is arranged to perform the inclusion of the indication and the appending of the second part when determined to apply the second part of the guard interval.

11. The transmitter of claim 10, wherein the determination whether to apply the second part of the guard interval comprises:
   determining whether coordinated beamforming transmission is performed between neighbouring access points;
   estimating impact of transients emanating from changes in the coordinated beamforming; and
   determining to apply the second part of the guard interval when estimated impact of transients has a timing within the second part of the guard interval.

12. The transmitter of claim 11, wherein the estimation of the impact of transients comprises a determination of timing of the second part of the guard interval and the estimated impact of transients based at least on one of:
   time dispersion of a channel on which the OFDM symbol is to be transmitted;
   estimated accuracy in synchronisation between a transmitting access point and a neighbouring interfering access point; and
   estimated duration of interfering transients from the neighbouring interfering access point.

13. The transmitter of claim 12, wherein the determined timing of the second part of the guard interval includes adaptation of an amount of repetition forming the second part to cover the estimated impact of the transients.

14. The transmitter of claim 7, wherein the transmitted is comprised in an access point for operating in an overlapping basic service set in a wireless local area network.

15. A receiver for receiving an Orthogonal Frequency Division Multiplex, OFDM, symbol via a channel, the OFDM symbol comprising a guard interval including a cyclically repeated part of an original symbol OFDM symbol, the receiver comprising:
   receiver circuitry configured to receive a signal comprising the OFDM symbol; and
   demodulation circuitry configured to:
      determine from the signal whether only a first part of the guard interval or also a second part of the guard interval is used for the OFDM symbol, where the second part includes a repeated part in addition to the first part, assign a transform window for the OFDM symbol based on the guard interval, and;
      assign a transform window for the OFDM symbol based on the guard interval;
      demodulate the OFDM symbol including performing a transform of information within the transform window;
      the second part of the guard interval comprises one of:
         an extended cyclic prefix in addition to the first part of the guard interval; and
         cyclic prefix; and
      the assigning of the transform window includes one of:
         overlapping the transform window with the second part of the cyclic prefix such that a final part of the OFDM symbol is outside the transform window; and
         overlapping the cyclic prefix part of the OFDM symbol with the transform window such that a final part of the OFDM symbol is outside the transform window.

16. The receiver of claim 15, wherein the receiver is comprised in a station for operating in an overlapping basic service set in a wireless local area network.

17. A non-transitory computer storage medium storing a computer program comprising instructions which, when executed on a processor of a transmitter, causes the transmitter to perform a method of transmitting an Orthogonal Frequency Division Multiplexing, OFDM, symbol comprising a guard interval including a cyclically repeated part of an original symbol, the method comprising
   applying a guard interval for the OFDM symbol, the guard interval comprising a first part, where the first part is a cyclic prefix;
   determining whether to use the second part of the guard interval, and when determined that the second part of the guard interval is to be used:
      including an indication that the applied guard interval comprises a second part, the second part being at least one of a cyclic prefix and a postfix;

applying the second part of the guard interval; and
transmitting the OFDM symbol;
the determining whether to use the second part of the guard interval comprises:
  determining whether coordinated beamforming transmission is performed between neighbouring access points;
  estimating impact of transients emanating from changes in the coordinated beamforming; and
  determining to apply the second part of the guard interval when estimated impact of transients has a timing within the second part of the guard interval.

* * * * *

UNITED STATES PATENT AND TRADEMARK OFFICE
CERTIFICATE OF CORRECTION

PATENT NO. : 11,894,962 B2
APPLICATION NO. : 17/624475
DATED : February 6, 2024
INVENTOR(S) : Sundman et al.

Page 1 of 1

It is certified that error appears in the above-identified patent and that said Letters Patent is hereby corrected as shown below:

On the Title Page

On Page 2, item (56), under "OTHER PUBLICATIONS", in Column 2, Line 16, delete "vol." and insert -- Vol. --, therefor.

In the Claims

In Column 14, Line 30, in Claim 15, delete "interval, and;" and insert -- interval; --, therefor.

Signed and Sealed this
Eleventh Day of February, 2025

Coke Morgan Stewart
*Acting Director of the United States Patent and Trademark Office*